A. S. FLEUTELOT.
Lubricator.
No. 211,142.  Patented Jan. 7, 1879.
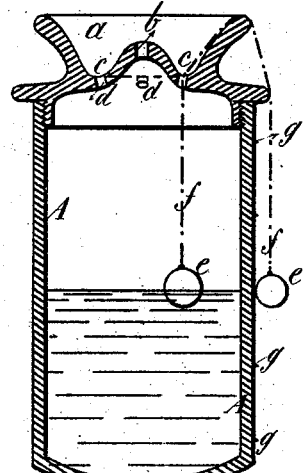
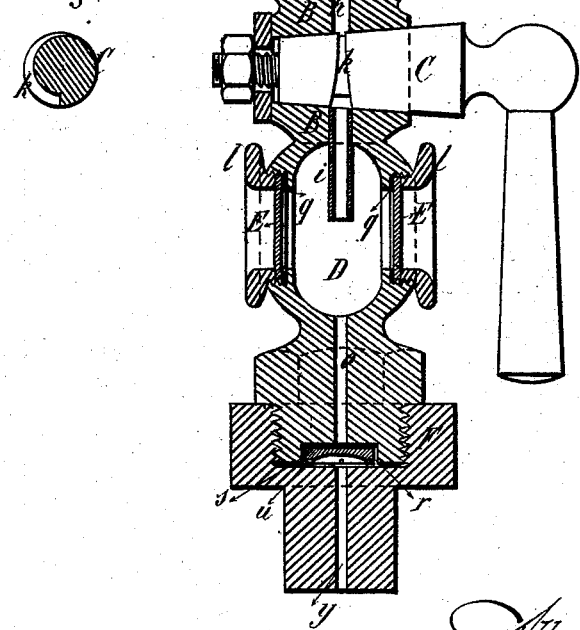

UNITED STATES PATENT OFFICE.

ALBERT S. FLEUTELOT, OF PARIS, FRANCE.

IMPROVEMENT IN LUBRICATORS.

Specification forming part of Letters Patent No. 211,142, dated January 7, 1879; application filed November 7, 1878.

*To all whom it may concern:*

Be it known that I, ALBERT STANISLAS FLEUTELOT, of Paris, France, have invented an Improvement in Lubricators, of which the following is a specification:

The lubricator which is the object of my invention is disposed so as to determine the introduction of oil especially into the cylinders, the slide-valves of a steam-engine, and all places filled with steam or air which it is necessary to lubricate, and so that oil will be introduced at each stroke of the piston or at each movement of the slide.

The cock that regulates the flow of the oil is furnished with an annular differential groove, with a section progressively decreasing, so that it is exceedingly easy to regulate the flow at will.

An inspection-chamber, placed between the oil-receptacle and the part to be lubricated, permits any one to examine the working of the apparatus. In the canal that leads from this inspection-chamber to the apparatus to be lubricated a valve is interposed, closing and opening the canal at each stroke of the piston or at each movement of the slide under the influence of the vacuum or of the pressure produced in this apparatus.

I will now proceed to describe the invention as illustrated in the accompanying drawings, showing a vertical section in Figure 1, and in Fig. 2 a transverse section of the cock, showing the differential groove which regulates the introduction of the oil.

It is composed of an oil-receptacle, A, closed by a screw-cap, $a$, in form of a small cup. It is pierced by an air-hole, $b$, open at all times. The cup $c$ is pierced at the bottom by holes $d$, to permit the introduction of oil when the engine is moving.

To determine the quantity of oil that is in the reservoir, I use an indicator, composed of two balls, rods, or floating washers, $e$, of a light material—as cork, wood, hollow metal, &c.—connected by a thread, $f$. One of these balls is inside, and floats on the surface of the oil. The other is outside, and is arranged opposite to a graduated line, $g$, on the reservoir, the extreme points corresponding with the top and bottom of the reservoir.

The oil descends from reservoir A by the canal $h$, through the shell B of the cock C.

The cock (seen in elevation, Fig. 1, and in transverse section, Fig. 2) is provided with an annular differential groove, $k$, the section of which is variable in breadth and depth, so that the passage can be adjusted and regulate the flow of oil. The oil falls, by tube $i$, to the bottom of chamber D, which is furnished laterally with two glass plates, secured by the screw-collars E. Washers $q$, of india-rubber, felt, or other material, hermetically seal the glass plates around the openings. This chamber D, with sights, permits the inspection of the flow of the oil.

The chamber D is screwed upon a socket, F, which is fixed upon the cylinder or point where the lubricator is required.

A small valve, $s$, is placed in a cavity, $r$, between the chamber D and piece F. The steam of the cylinder acts upon the valve at each fresh inlet and raises it to close the oil-passage $o$, and at each stroke of the piston the cut-off or exhaust relieves the valve $s$. It then falls by its own weight. The atmospheric pressure, acting through the holes $d$, causes the oil to run through the opening $o$, thence through the grooves $u$ on the under side of the valve $s$ and passage $y$, to the parts to be lubricated.

I am aware that lubricators have been constructed with adjustable discharge, and also with inspection, openings, through which the oil flows, and therefore do not broadly claim such construction.

I claim—

1. The combination of the oil-receptacle A and cock C, arranged transversely across the discharge-opening from the oil-receptacle, and constructed with the annular differential groove $k$, regulating the passage from the receptacle, and substantially as described.

2. The combination of the oil-receptacle A, cock C, and passage through it, with the tube $i$ in the inspection-chamber D, below the cock, provided with glass sights, substantially as described.

In testimony whereof I have signed my name to this specification before two subscribing witnesses.

A. S. FLEUTELOT.

Witnesses:
 ROBT. M. HOOPER,
 J. ARMENGAUD, Jeune.